United States Patent [19]

Yoshimura et al.

[11] 3,950,083

[45] Apr. 13, 1976

[54] FADING AUDIO-LEVEL CONTROLS FOR SOUND-RECORDING MOTION PICTURE CAMERAS

[75] Inventors: Hirofumi Yoshimura; Toyonori Higuma; Noriaki Itoo, all of Tokyo, Japan

[73] Assignee: Kabushiki Kaisha Yashika, Japan

[22] Filed: Oct. 18, 1974

[21] Appl. No.: 515,898

[30] Foreign Application Priority Data

Oct. 23, 1973 Japan.............................. 48-119106

[52] U.S. Cl. ............... 352/25; 352/91 C; 352/91 S
[51] Int. Cl.² ................... G03B 31/02; G03B 21/36
[58] Field of Search............ 352/22, 25, 91 R, 91 C, 352/91 S; 360/3

[56] References Cited
UNITED STATES PATENTS
3,649,109   3/1972   Isono et al. ........................ 352/91 S

*Primary Examiner*—L. T. Hix
*Assistant Examiner*—Russell E. Adams, Jr.
*Attorney, Agent, or Firm*—Steinberg & Blake

[57] ABSTRACT

A motion picture camera capable of recording sound simultaneously with film exposure and capable of carrying out fade-out as well as fade-in operations. A control is provided for automatically reducing the audio level during a fade-out operation and for automatically increasing the audio level during a fade-in operation.

12 Claims, 6 Drawing Figures

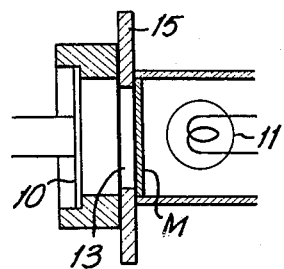
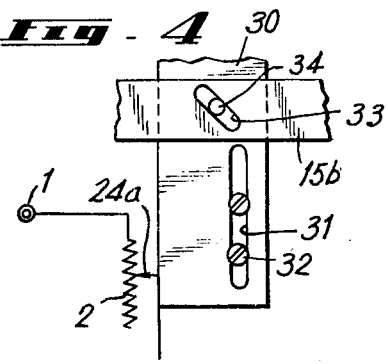
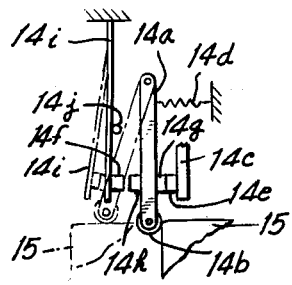
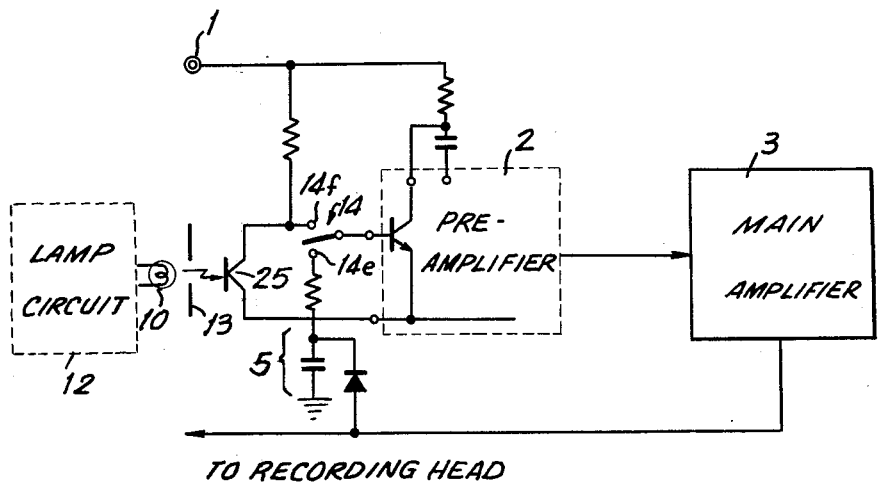

FADING AUDIO-LEVEL CONTROLS FOR SOUND-RECORDING MOTION PICTURE CAMERAS

BACKGROUND OF THE INVENTION

The present invention relates to motion picture cameras of the type which are also capable of recording sound.

Thus, with such cameras the film which is used has a magnetic coating so that it is possible to record sound simultaneously with film exposure.

In connection with the changing or joining of scenes, it is well known that a motion picture camera can be operater to carry out special techniques such as fade-in, fade-out, or overlapping.

In order for the sound-recording operation to harmonize with the fading operations, the audio level of the sound-recording equipment should diminish gradually during a fade-out operation and increase gradually during a fade-in operation. Thus, a constant audio level during fade-in or fade-out detracts from the illusion to be created during projection of the film and playback of the sound recording.

SUMMARY OF THE INVENTION

It is accordingly a primary object of the present invention to provide a sound-recording motion picture camera with the capability of regulating the audio level so that it will harmonize properly with fade-in, fade-out, or overlapping operations.

In particular, it is an object of the present invention to provide an automatic regulation of the audio level during fading operations.

In particular, it is an object of the present invention to provide an audio-level control of the above type which will not interfere with the automatic maintenance of the audio level during normal operation of the camera when fading operations are not carried out.

In addition it is an object of the present invention to provide a construction of the above type which is relatively simple and inexpensive while at the same time being highly reliable in operation and occupying only a small space while consuming little additional energy so that with a relatively small initial and operating cost it is possible to equip motion picture cameras with the structure of the invention.

According to the invention the motion picture camera includes a fade means for carrying out fade-in and fade-out operations. Also, the motion picture camera includes a sound-recording means for recording sound simultaneously with film exposure. An adjustable means is operatively connected with the sound-recording means for adjusting the audio level thereof, and a control means is operatively connected on the one hand to the adjustable means and on the other hand to the fade means for adjusting the adjustable means to reduce the audio level during a fade-out operation and to increase the audio level during a fade-in operation. This construction is such that the audio level decreases gradually during a fade-out operation and increases gradually during a fade-in operation. In the case where the fading operations are carried out manually, the control of the audio level can be carried out by adjusting the audio level either in response to manual operation of the fading structure or by manually operating the sound-recording structure.

BRIEF DESCRIPTION OF DRAWINGS

The invention is illustrated by way of example in that accompanying drawings which form part of this application and in which:

FIG. 3 is a schematic fragmentary sectional view on an enlarged scale, as compared to FIGS. 1 and 2, of and adjustable means for adjusting the audio level and part of the control means which carries out the adjustment of the adjustable means;

FIG. 4 is a schematic representation of another embodiment of the invention;

FIG. 5 is a circuit diagram of a still further embodiment of the invention; and

FIG. 6 is a fragmentary schematic illustration of the operation of a switch means of FIG. 5.

DESCRIPTION OF PREFERRED EMBODIMENTS

Except for the audio level regulation of the present invention, the sound recording circuit which is utilized is of a well-known type commonly placed within a motion picture camera. Referring to the upper left portion of FIG. 1, the sound-recording signal is supplied by way of a microphone terminal 1, with this signal being transmitted to a main amplifier 3 after passing through a pre-amplifier 2. The signal which is amplified by the main amplifier 3 is high-frequency biased and transmitted to a recording head 4 which is schematically illustrated. The audio level during normal sound-recording which takes place during normal film exposure is regulated by way of an adjusting circuit (ALC) 5 which contains the resistor $R_2$ and diode D.

Figure 1:
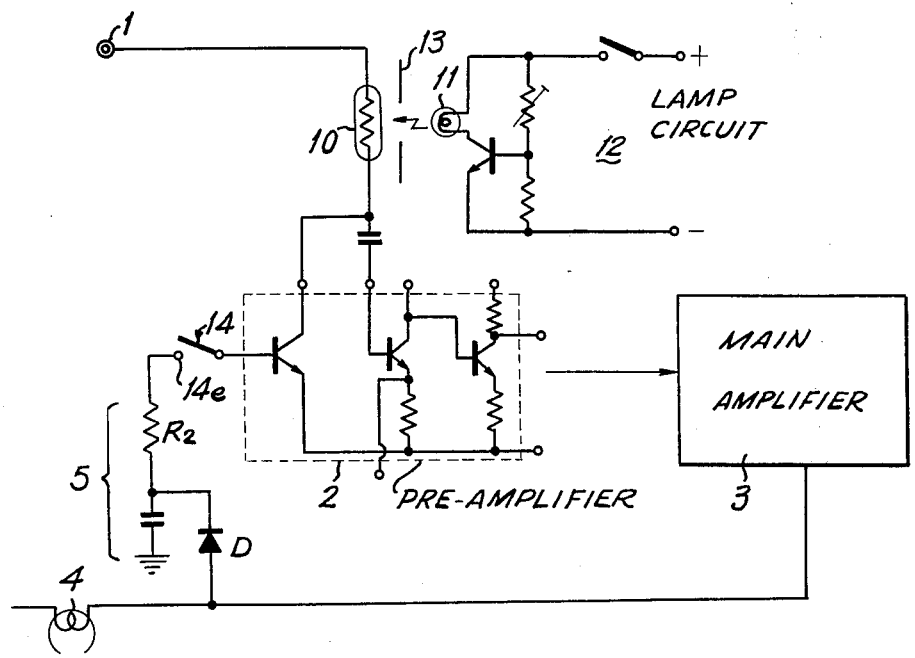
FIG. 1 is a circuit diagram of part of a sound-recording system of a motion picture camera.

This conventional sound-recording means 1–5 of the motion picture camera is provided, in accordance with the invention, with an adjustable means capable of regulating the audio level during fading operations. This adjustable means in the example of FIG. 1 includes a photoresponsive means 10 in the form of a cadmium sulfide resistor element which will provide a resistance whose value varies in response to light which impinges on the photosensitive means 10, in a well known manner. This variable resistor type of photosensitive means 10 is connected in series with the microphone terminal 1, between the latter and the preamplifier 2, as illustrated in FIG. 1. A light-source means is formed by a lamp 11 which is positioned in such a way that light from the energized light-source means 11 will be received by the photosensitive means 10. During operation of the camera the light-source means is maintained continuously energized by operation of a suitable lamp circuit 12. A control means is provided to control the resistance value provided by the photosensitive means 10, and this control means is formed by a diaphragm means 13 providing a variable aperture which can be adjusted with respect to the lamp 11 so as to control the extent to which light is transmitted from the lamp 11 to the photosensitive means 10. This control means 13 is operatively connected also to a fade means which is operated for carrying out fade-in or fade-out operations.

With this circuit of FIG. 1, when the diaphragm means 13 is operated so as to be gradually stopped down, to diminish the light transmitted to the photosensitive means 10, during a fade-out operation, the resistance value of the photosensitive means 10 will gradually increase since, as is well known, the resistance of the cadmium sulfide resistor varies inversely with the amount of light received thereby. Thus, during the diminishing of the light received by the photosensitive means 10, the resistance provided thereby gradually increases so as to gradually reduce the audio level. On the other hand, during a fade-in operation the aperture provided by the diaphragm means 13 gradually increases so that a greater amount of light is received by the photosensitive means 10, with a corresponding reduction in the resistance provided thereby until in the end position when fade-in has been completed the amount of light received by the photosensitive means 10 is at a maximum providing no limitation whatsoever on the sound-recording signal transmitted to the amplifiers 2 and 3. In order to provide regulation of audio level by way of the adjustable means 10, it is necessary to disconnect the automatic audio-level adjustment provided by way of the circuit 5. This disconnection is brought about by opening of the normally-closed switch 14. Thus, the switch 14 is normally closed at the contact 14e, and in order to render the regulation from the adjustable means 10 effective, the switch 14 is opened by being displaced away from the contact 14e.

Figure 2:
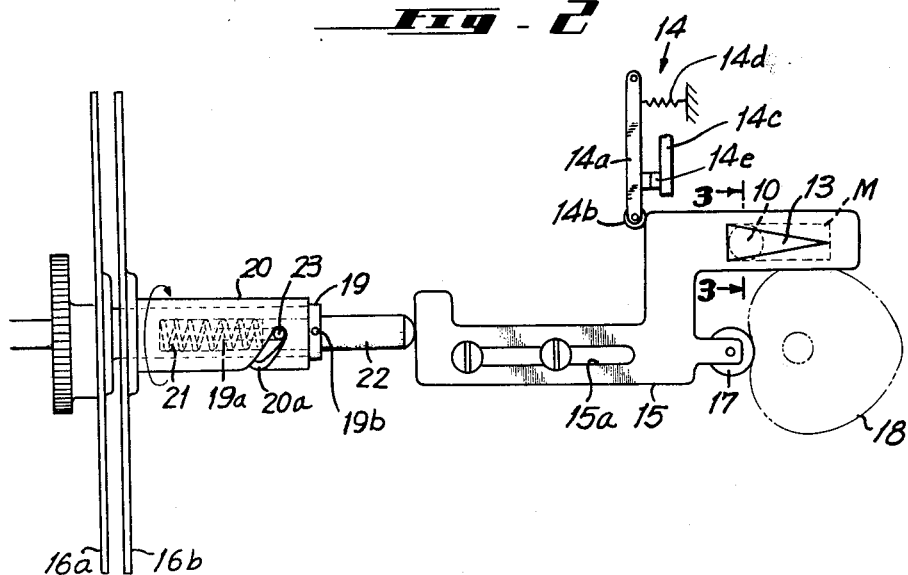
FIG. 2 is a fragmentary schematic illustration of the fade means of a motion picture camera and one embodiment of a control means operatively connected therewith for regulating the audio level in the manner shown in FIG. 1.

FIG. 2 illustrates one example of the manner in which the control means 13 is operatively connected with the fade means utilized to carry out fade-in and fade-out operations. As may be seen from FIG. 2, the diaphragm means 13 is formed by a portion of a fade arm 15, this portion being formed with the triangular aperture which constitutes a tapered type of aperture for the diaphragm means 13. As may be seen particularly from FIG. 3, the portion of the arm 15 which is provided with the aperture 13 is situated between the lamp 11 and the photosensitive means 10 so that the light from the lamp 11 necessarily travels through the aperture 13 before reaching the photosensitive means 10. Also, a diffusing means formed by a light-diffusing plate M is situated between the lamp 11 and the photosensitive means 10, in a manner shown most clearly in FIG. 3. In order to achieve a smooth variation in the audio level, it is desirable to use the light-diffusing plate M which is made of a material which has a high diffusibility. Thus, the position of the diaphragm means 13 and the lamp 11 and photosensitive means 10 with respect to each other is such that the largest diaphragm aperture will be situated between the lamp 11 and the photosensitive means 10 during normal photographing operations.

As may be seen from FIG. 2, the fad arm 15 of the fade means is capable of reciprocating by way of an elongated guide slot 15a through which a pair of stationary pins extend. The position of the fade arm 15 with respect to these pins which extend through the slot 15a will determine the aperture angle provided by way of the shutter blades 16a and 16b, this angle being capable of variation in accordance with the angular relationship between the rotary shutter blades 16a and 16b. It is possible to reciprocate the fade arm 15 manually or, as indicated in FIG. 2, automatically by cooperation of a cam-follower roller 17, carried by the arm 15, with the camming periphery of a rotary heart-shaped cam 18. Thus, either the arm 15 will be manually displaced to move the slot 15a along the guide pins or the cam 18 will be turned to act through the roller 17 on the arm 15 so as to reciprocate the latter in the same way.

As is well known, the shutter blades 16a and 16b rotate together, without any relative movement therebetween, as a single unit providing a predetermined aperture angle which remains unchanged during normal photographing operations. During fading operations, however, the aperture angle is varied. For this purpose the shaft 19 which carries the blade 16a extends freely through the tubular shaft 20 which carries the blade 16b. This shaft 19 is formed with an axial bore which houses in its interior a compressed spring 21 which presses against a fade rod 22 which is slidable within the axial bore of the shaft 19. Thus the spring 21 seeks to move the rod 22 to the right, as viewed in FIG. 2, and, as is shown in FIG. 2, the right free end of the rod 22 engages the left free end of the fade arm 15. The fade rod 22 is fixed with a pin 23 which extends radially from the fade rod 22 through an axial slot 19a which is formed in the shaft 19, this pin 23 extending outwardly beyond the slot 19a into a helical slot 20a formed in the tubular shaft 20. A pin 19b is carried by the shaft 19 and engages the right free end of the tubular shaft 20 as to prevent axial movement of the latter, and thus the shaft 20 can only turn around the shaft 19 in response to displacement of the pin 23 along the slot 19a.

Thus, with this construction the parts will normally assume the position shown in FIG. 2 and the shutter blades 16a and 16b will rotate together as a unit. At this time, during normal photographing operations, the fade means 15 is in the rest position illustrated in FIG. 2 where the largest end of the diaphragm aperture is in the path of travel of light from the lamp 11 to the photosensitive means 10. Accordingly, at this time the resistance value provided by the photosensitive means 10 is at a constant minimum value, and at the same time the switch 14 remains in its normally closed position so that the audio level is automatically regulated by way of the conventional circuit 5 provided for this purpose. Thus the sound recording level is 0dB. Therefore, at this time the sound recording is carried out without any influence on the sound-recording signal from the photosensitive means 10.

As is illustrated in FIG. 2, the switch means 14 assumes its normally closed position, for example under the action of a spring 14d when the fade means 15 is in the rest position illustrated in FIG. 2. Thus, at this time the pivoted arm 14a of the switch means 14 has a contact insulated therefrom in engagement with the stationary contact 14e carried by any suitable support 14c.

When a scene is about to end so that a fade-out operation is required, the fade means 15 will be shifted to the left, as viewed in FIG. 2, with the result that the arm 14a will be turned in opposition to the spring 14d in a clockwise direction, as viewed in FIG. 2, thus opening the switch 14 and rendering the normal audio-level adjusting control 5 ineffective, as is apparent from FIG. 1. At the same time, as the arm 15 moves to the left, as viewed in FIG. 2, the rod 22 is pushed also to the left, in opposition to the spring 21, so that the pin 23 moves along the slot 19a and acts through the helical slot 20a so as to rotate the shaft 20 and the blade 16b in the direction of the arrow shown in FIG. 2, for reducing the angle of aperture provided by the shutter blades 16a and 16b. Thus, the aperture angle provided by the shutter blades will gradually decrease as the fade arm 15 continues to move to the left, as viewed in FIG. 2, and this fade-out operation will continue until the arm 15 reaches its extreme left position where the aperture angle of the shutter 16a, 16b becomes zero, which is to say the shutter is completely closed, thus completing the fade-out operation. This movement of the fade arm 15 to the left, as viewed in FIG. 2, causes the aperture 13 to move also to the left, as viewed in FIG. 2, so that the diaphragm aperture is gradually stopped down to gradually decrease the extent of light transmission from the lamp 11 to the photosensitive means 10. This result is achieved by the tapered triangular aperture shown in FIG. 2. As this aperture moves to the left with respect to the lamp 11, the light therefrom is blocked to an increasing extent. Thus the fixed photosensitive means 10 will gradually receive less light so that the resistance value provided by the photosensitive means 10 will gradually increase. As a result, while the fade-out operation proceeds, the sound-recording signal from the microphone terminal 1 gradually diminishes so that the audio level is reduced.

On the other hand, during a fade-in operation, the fade arm 15 moves to the right, as viewed in FIG. 2, from its extreme left position at the end of the fade-out operation. At this time the switch 14 still remains open. During the continued movement of the arm 15 to the right, as viewed in FIG. 2, to carry out a fade-out operation, the initially completely closed shutter is gradually opened until the aperture provided by the shutter reaches the predetermined aperture value, so that in this way a fade-in operation is performed. Simultaneously, the diaphragm means 13 is moved with respect to the light source means 11 and the photosensitive means 10 so as to increase the extent to which light is transmitted from the light source means 11 to the photosensitive means 10. In other words, the aperture through which the light can travel is gradually enlarged or opened until upon completion of the fade-in operation, the structure reaches the position indicated in FIG. 2 where the fully open state of the aperture is provided for normal photographing operations. Thus, during the fade-in operation, the procedure is exactly the reverse of that described above in connection with the fade-out operation. As a result the resistance value of the light-responsive means 10 gradually decreases so that the sound-recording signal gradually increases while the fade-in operation proceeds. At the end of the fade-in operation the switch 14 again assumes its normally closed position so that the audio level is now again controlled by way of the circuit 5 and the resistance value of the photosensitive means 10 is negligible so that it has no influence on the operation.

Referring now to FIG. 4, the embodiment of the invention which is illustrated therein utilizes as an adjustable means for the sound-recording means, during fading operations, a variable resistor 24 such as a potentiometer, rather than a photosensitive means 10 and a light source for directing light to the photosensitive means. Also, a control means in the form of a diaphragm means 13 is not required with this embodiment. The potentiometer 24 includes the sliding contact 24a which is electrically connected to the pre-amplifier 2, so that the resistance determined by the position of the sliding contact 24a will be transmitted to the pre-amplifier 2. With this embodiment the fade means 15 is operatively connected with the sliding contact 24a so as to increase or decrease the resistance during operation of the fade means 15. Thus, as is shown schematically in FIG. 4, the sliding contact 24a is carried by and insulated from a plate 30 which is guided for movement by way of an elongated slot 31 which receives guide pins 32, so that the plate 30 together with the sliding contact 24a are guided for vertical movement, as viewed in FIG. 4. The plate 30 carries a pin 34 which extends through an inclined slot 33 formed in an extension 15b of the arm 15 of FIG. 2, it being understood that with this embodiment the arm 15 has only the extension 15b and does not carry a diaphragm means 13. However the arm 15 still operates the switch means 14 in the manner shown in FIG. 2 so that the automatic means 5 for automatically adjusting the audio level during normal sound recording is rendered ineffective during the time when the fading operations are going forward. As a result of the inclined slot 33, when the arm 15 is moved to the left, as viewed in FIG. 2, in order to carry out a fade-out operation, the extension 15b of FIG. 4 will move to the left so as to cause the pin 34 to be cammed downwardly, with the result that the plate 30 will be displaced downwardly, as viewed in FIG. 4, thus moving the sliding contact 24a downwardly, as viewed in FIG. 4. As a result the resistance taken from the potentiometer 24 gradually increases during a fade-out operation so as to reduce the audio level automatically in this way. Of course, when the arm 15 is returned to its rest position, during a fade-in operation, the slot 33 will cam the pin 34 upwardly so as to cause the resistance value provided by way of the potentiometer 24 to diminish, and thus the audio level will gradually increase during a fade-in operation. With this embodiment also when the fade means 15 is in its rest position the contact 24a is at a position along the resistor of the potentiometer 24 which will provide only a negligible resistance having no influence on the operation of the sound-recording means with the audio level at this time being controlled by the automatic means 5 inasmuch as the switch 14 closes automatically upon return of the fade means 15 to its rest position, as described above.

Thus, with the embodiment of FIG. 4 the movement of the fade arm 15 causes the value of the variable resistor to be gradually increased during a fade-out operation and to be gradually decreased during a fade-in operation, so that this embodiment of FIG. 4 achieves the same results as the above-described embodiment of FIGS. 1–3.

FIG. 5 illustrates a third embodiment of the invention. With the embodiment of FIG. 5 instead of a photosensitive means in the form of a cadmium sulfide resistor 10, there is a photosensitive means in the form of a photo-transistor 25. This photo-transistor 25 receives light from the lamp 10 which is controlled by a lamp circuit 12 which may be the same as that of FIG. 1. Thus the lamp 10 will be energized continuously during operation of the camera. Also, with the embodiment of FIG. 5 the control means for controlling the adjustable means 25 may be the same as that of FIGS. 1–3, so that the control means takes the form of the diaphragm means 13 which is connected in the manner shown in FIG. 2 to the arm 15 to provide a gradual decrease in the audio level during a fade-out operation and a gradual increase in the audio level during a fade-in operation.

However, with the embodiment of FIG. 5 the switch means 14 not only serves to connect the automatic means 5 into the circuit during normal operation and to disconnect the automatic means 5 during fading operations, but in addition the switch means 14 of FIG. 5 serves to connect the adjustable means 25 into the circuit only during fading operations with the adjustable means 25 being disconnected from the circuit during normal operations when the automatic means 5 is operative.

Thus, as may be seen from FIG. 5 the switch means 14 is movable between a pair of contacts 14e and 14f. As may be seen from FIG. 6, the switch means 14 may have with respect to the automatic means 5 the same construction as shown in FIGS. 1 and 2. Thus the arm 14a carries the roller 14b which engages the shoulder of the fade arm 15 in the manner shown in FIG. 6. Thus when the fade arm 15 is in its rest position the contact 14g will engage the stationary contact 14e so that the switch 14 assumes its normally closed position rendering the automatic means 5 operative. With this embodiment, however, when the fade arm 15 is moved to the left, as viewed in FIGS. 2 and 6, the lever 14a is swung to the dot-dash line position shown in FIG. 6. In this case the arm or lever 14a carries and is insulated from a second contact 14h which engages the contact 14f immediately after the contact 14g moves away from the contact 14e. This contact 14f is carried by a leaf spring 14i from which the contact 14f is insulated, and the leaf spring 14i tends to move the contact 14f toward the right, but engages a stationary stop member 14j, the location of which may be adjustable in any known manner so that the position of the contact 14f with respect to the contact 14h may be adjusted to maintain contact 14f away from the contact 14h when the arm 15 is in its rest position where the contact 14g engages the contact 14e. Thus when the lever 14a is turned to the dot-dash line position of FIG. 6, the contacts 14f and 14h will engage each other immediately after the contact 14g moves away from the contact 14e, and the leaf spring 14i will be deflected to the dot-dash line position shown in FIG. 6 while the contact 14h remains in engagement with the contact 14f. In this way, as is apparent from FIG. 5, the adjustable means 25 is rendered operative during fading operations and inoperative just before the arm 15 returns to its rest position shown in FIG. 2 when the switch 14 will again be closed at its contact 14e to render the automatic means 5 operative.

Thus, as was pointed out above, in accordance with the present invention during a fade-out operation the audio level of the sound-recording means of the motion picture camera can be gradually diminished from the normal level. On the other hand, during a fade-in operation, the previously diminished audio level will be gradually increased up to the normal level. This control of the audio level during fading operations is carried out in response to movement of the fade means which is essential for carrying out fading operations, so that the control of the audio level during fading operations is carried out in a precise manner, with the audio level gradually decreasing and increasing as fade-out and fade-in operations proceed, respectively. As a result it is possible with the present invention to achieve an operation of a motion picture camera which previously has not existed with the advantage of improving the quality of the sound recording of the motion picture camera.

What is claimed is:

1. In a motion picture camera, fade means for carrying out fade-out and fade-in operations, sound-recording means for recording sound during film exposure, adjustable means operatively connected with said sound-recording means for adjusting the audio level thereof, and control means operatively connected on the one hand to said adjustable means and on the other hand to said fade means for automatically controlling said adjustable means to reduce the audio level when a fade-out operation is carried out by said fade means and to gradually increase the audio level when a fade-in operation is carried out by said fade means.

2. In a motion picture camera, fade means for carrying out fade-out and fade-in operations, sound-recording means for recording sound during film exposure, adjustable means operatively connected with said sound-recording means for adjusting the audio level thereof, and control means operatively connected on the one hand to said adjustable means and on the other hand to said fade means for automatically controlling said adjustable means to reduce the audio level when a fade-out operation is carried out by said fade means and to increase the audio level when a fade-in operation is carried out by said fade means, said sound-recording means including an automatic means for automatically controlling the audio level during normal film exposure and sound-recording, and switch means electrically connected with said automatic means for rendering the latter ineffective during operation of said fade means.

3. The combination of claim 2 and wherein said fade means has a predetermined rest position during normal film exposure and sound-recording when fading operations are not carried out, and said fade means when in said rest position thereof acting through said control means on said adjustable means for preventing the latter from influencing said sound-recording means.

4. The combination of claim 2 and wherein said switch means is operatively connected with said adjustable means for rendering the latter effective only when said automatic means is rendered ineffective during fading operations.

5. In a motion picture camera, fade means for carrying out fade-out and fade-in operations, sound-recording means for recording sound during film exposure, adjustable means operatively connected with said sound-recording means for adjusting the audio level thereof, and control means operatively connected on the one hand to said adjustable means and on the other hand to said fade means for automatically controlling said adjustable means to reduce the audio level when a fade-out operation is carried out by said fade means and to increase the audio level when a fade-in operation is carried out by said fade means, said adjustable means being a photosensitive means for responding to light in order to adjust the audio level, light-source means positioned with respect to said photosensitive means for directing light to the latter, and said control means being situated between said light-source means and said photosensitive means for regulating the amount of light transmitted from said light-source means to said photosensitive means in response to operation of said fade means.

6. The combination of claim 5 and wherein said control means includes between said light-source means and said photosensitive means a diaphragm means for varying the extent to which light is transmitted from said light-source means to said photosensitive means during fading operations.

7. The combination of claim 6 and wherein a light-diffusing means is situated between said light-source means and said photosensitive means for diffusing the light transmitted by way of said diaphragm means to said photosensitive means.

8. The combination of claim 6 and wherein said diaphragm means includes a member formed with a tapered aperture through which light travels from said light-source means to said photosensitive means, and said member moving in response to operation of said fade means for blocking light from said light-source means to a variable extent during fading operations.

9. The combination of claim 8 and wherein said diaphragm means decreases the extent of light transmission during a fade-out operation and increases the extent of light transmission during a fade-in operation.

10. The combination of claim 9 and wherein said photosensitive means is a photosensitive resistor whose resistance varies inversely with respect to the amount of light received by said photosensitive means from said light-source means.

11. The combination of claim 5 and wherein said photosensitive means is a photo-transistor.

12. In a motion picture camera, fade means for carrying out fade-out and fade-in operations, sound-recording means for recording sound during film exposure, adjustable means operatively connected with said sound-recording means for adjusting the audio level, thereof, and control means operatively connected on the one hand to said adjustable means and on the other hand to said fade means for automatically controlling said adjustable means to reduce the audio level when a fade-out operation is carried out by said fade means and to increase the audio level when a fade-in operation is carried out by said fade means, said adjustable means being a variable resistor operatively connected with said control means to be adjusted thereby.

* * * * *